(12) United States Patent
Ito

(10) Patent No.: US 6,476,249 B1
(45) Date of Patent: Nov. 5, 2002

(54) COPOLYCARBONATE AND PROCESS FOR PRODUCING THE SAME

(75) Inventor: Mitsunori Ito, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/554,109

(22) PCT Filed: Aug. 11, 1999

(86) PCT No.: PCT/JP99/04348

§ 371 (c)(1),
(2), (4) Date: May 26, 2000

(87) PCT Pub. No.: WO00/18822

PCT Pub. Date: Jun. 4, 2000

(30) Foreign Application Priority Data

Sep. 28, 1998 (JP) ............................................ 10-272750
Sep. 28, 1998 (JP) ............................................ 10-272751

(51) Int. Cl.$^7$ ................................................. C07C 69/96
(52) U.S. Cl. ........................................ 558/265; 528/271
(58) Field of Search ............................ 528/271; 558/265

(56) References Cited

FOREIGN PATENT DOCUMENTS

| JP | 61-268725 | 11/1986 |
| JP | 64-6020 | 1/1989 |
| JP | 1-158033 | 6/1989 |
| JP | 4-309525 | 11/1992 |
| JP | 5-156000 | 6/1993 |
| JP | 9-235368 | 9/1997 |
| JP | 9-265663 | 10/1997 |

OTHER PUBLICATIONS

Patent Abstracts of Japan, JP 10 007785, Jan. 13, 1998.

*Primary Examiner*—Paul F. Shaver
(74) *Attorney, Agent, or Firm*—Oblon, Spivak, McClelland, Maier & Neustadt, P.C.

(57) ABSTRACT

Provided are an aromatic polycarbonate copolymer and a method for producing it. An aromatic dihydroxy compound, at least one member selected from the group consisting of polyorganosiloxanes and aliphatic polyalcohols, and a dicarbonate are prepolymerized under heat to give a polycarbonate prepolymer, and the prepolymer is polymerized in a solid or swollen solid phase in the presence of a quaternary phosphonium salt serving as a catalyst to give an aromatic polycarbonate copolymer. The remaining monomer content, the acetone soluble content (that is, the low-molecular-weight substance content) and the cyclic oligomer content of the copolymer are all reduced, and the terminal hydroxyl fraction thereof is also reduced.

10 Claims, No Drawings

COPOLYCARBONATE AND PROCESS FOR PRODUCING THE SAME

TECHNICAL FIELD

The present invention relates to a polycarbonate copolymer with reduced monomers and others remaining therein, and to a method for producing it. Precisely, the invention relates to an aromatic polycarbonate copolymer copolymerized with at least one member selected from the group consisting of polyorganosiloxanes and aliphatic polyalcohols, and to a method for producing it. The method comprises preparing a prepolymer through melt prepolymerization followed by polymerizing the prepolymer in a solid phase or in a swollen solid phase to give the polycarbonate copolymer.

BACKGROUND ART

For producing aromatic polycarbonates, known are a method of directly reacting an aromatic dihydroxy compound such as bisphenol A or the like with phosgene (interfacial polycondensation), and a method of transesterifying an aromatic dihydroxy compound such as bisphenol A or the like with a dicarbonate such as diphenyl carbonate or the like (melt polymerization, solid-phase polymerization).

However, the interfacial polycondensation method is problematic in that it requires toxic phosgene and the chlorine-containing side products formed corrode the apparatus used. On the other hand, the melt polymerization method is free from the problem, but is confronted with another problem in that the amount of monomers and other low-molecular-weight substances such as acetone-soluble substances remaining in the polymers produced is large. As a result, the impact resistance of the polymers is low, and the polymers are difficult to release from molds.

To reduce monomers that may remain in polymers produced through melt polymerization, proposed was adding a low-boiling-point compound to the polymerization system in extruders (Japanese Patent Laid-Open Nos. 59367/1997, 59368/1997, 67433/1997, 157375/1997, 156000/1993, 157586/1996), but this is still unsatisfactory. No report is found, relating to solid-phase polymerization to give aromatic polycarbonates copolymerized with at least one member selected from the group consisting of polyorganosiloxanes and aliphatic polyalcohols.

The present invention is to provide an aromatic polycarbonate copolymer copolymerized with at least one member selected from the group consisting of polyorganosiloxanes and aliphatic polyalcohols, in which the remaining monomers, acetone-soluble substances (low-molecular-weight substances) and cyclic oligomers are all reduced and of which the terminal hydroxyl content is also reduced, and to provide a method for producing the copolymer.

DISCLOSURE OF THE INVENTION

Having assiduously studied the problems noted above, the present inventor has completed the invention, which includes the following:

[1] An aromatic polycarbonate copolymer with units of an aromatic dihydroxy compound being copolymerized with at least one member selected from the group consisting of polyorganosiloxanes and aliphatic polyalcohols via a carbonate group therebetween, of which the total of the dihydroxy compound content, the dicarbonate content and the monohydroxy compound content is smaller than 100 ppm.

[2] An aromatic polycarbonate copolymer with units of an aromatic dihydroxy compound being copolymerized with at least one member selected from the group consisting of polyorganosiloxanes and aliphatic polyalcohols via a carbonate group therebetween, of which the dihydroxy compound content is smaller than 100 ppm.

[3] An aromatic polycarbonate copolymer with units of an aromatic dihydroxy compound being copolymerized with at least one member selected from the group consisting of polyorganosiloxanes and aliphatic polyalcohols via a carbonate group therebetween, of which the acetone soluble content is at most 3.0% by weight.

[4] An aromatic polycarbonate copolymer with units of an aromatic dihydroxy compound being copolymerized with at least one member selected from the group consisting of polyorganosiloxanes and aliphatic polyalcohols via a carbonate group therebetween, of which the cyclic oligomer content is at most 0.45% by weight.

[5] An aromatic polycarbonate copolymer with units of an aromatic dihydroxy compound being copolymerized with at least one member selected from the group consisting of polyorganosiloxanes and aliphatic polyalcohols via a carbonate group therebetween, of which the terminal hydroxyl fraction is at most 20% by mol.

[6] An optical material comprising the polycarbonate copolymer of any of above [1] to [5].

[7] A method for producing a polycarbonate copolymer through transesterification of (A) an aromatic dihydroxy compound and (B) at least one member selected from the group consisting of polyorganosiloxanes and aliphatic polyalcohols with (C) a dicarbonate, which comprises prepolymerizing the dihydroxy compound, at least one member selected from the group consisting of polyorganosiloxanes and aliphatic polyalcohols, and the dicarbonate under heat to give a polycarbonate prepolymer, followed by polymerizing the prepolymer in a solid or swollen solid phase in the presence of a quaternary phosphonium salt serving as a catalyst.

[8] The method for producing a polycarbonate copolymer of above [7], wherein a nitrogen-containing, organic basic compound that serves as a catalyst is used in the prepolymerization step to give the polycarbonate prepolymer.

[9] The method for producing a polycarbonate copolymer of above [7] or [8], wherein the polycarbonate prepolymer is polymerized in an atmosphere containing at least one gas selected from the group consisting of bad solvent gases, swelling solvent gases and inert gases, in a solid or swollen solid phase in the presence of a quaternary phosphonium salt serving as a catalyst.

BEST MODES OF CARRYING OUT THE INVENTION

[I] Polycarbonate Copolymer

The polycarbonate copolymer of the invention comprises units of an aromatic dihydroxy compound copolymerized with at least one member selected from the group consisting of polyorganosiloxanes and aliphatic polyalcohol via a carbonate group therebetween, and the amount of the monomers remaining in the copolymer is smaller than 100 ppm in terms of the total of the dihydroxy compound content, the dicarbonate content and the monohydroxy compound content of the copolymer.

The organosiloxane unit-having copolymer of the invention is an improvement on ordinary aromatic polycarbonates in point of its flame retardancy, fluidity, impact resistance and mold releasability. This is especially favorable to optical materials, as being well molded into non-halogen, flame-retardant, thin-walled moldings with good distortion resistance.

The copolymer of the present invention having a unit of the organosiloxane is a random, block or graft copolymer which comprises units of an aromatic dihydroxy compound copolymerized with a polyorganosiloxane via a carbonate group therebetween. In this, the organosiloxane units and the aromatic dihydroxy-carbonate units are represented by the following formulae (1) and (2), respectively.

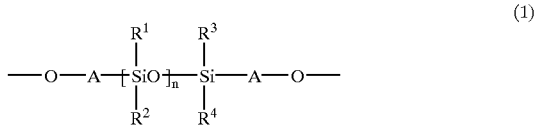

(1)

wherein $R^1$ to $R^4$ each represent an alkyl group having from 1 to 8 carbon atoms (e.g., methyl group, ethyl group, propyl group, n-butyl group, isobutyl group, amyl group, isoamyl group, hexyl group, etc.), or an aryl group having from 6 to 20, but preferably from 6 to 18 carbon atoms (e.g., phenyl group, tolyl group, xylyl group, naphthyl group, etc.), and these may be the same or different; A represents a divalent organic residue including an aliphatic or aromatic group, for example, a methylene group, an ethylene group, a propylene group, a butylene group, a pentylene group, a hexylene group, an ethylidene group, an isopropylidene group, a cyclopentylene group, a cyclohexylene group, a cyclopentylidene group, a cyclohexylidene group, etc., or an o-allylphenol residue, a p-vinylphenol residue, an eugenol residue, a bisphenol A residue, etc.; and n falls between 0 ad 500.

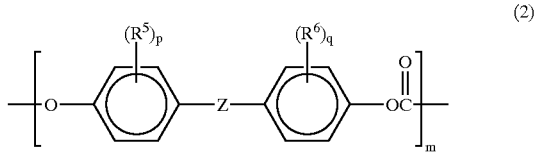

(2)

wherein $R^5$ and $R^6$ each represent a halogen atom of fluorine, chlorine, bromine or iodine, an alkyl group having from 1 to 8 carbon atoms, for example, a methyl group, an ethyl group, an n-propyl group, an isopropyl group, an n-butyl group, an isobutyl group, a sec-butyl group, a t-butyl group, a pentyl group, a hexyl group, a cyclohexyl group, a heptyl group, an octyl group, etc.; $R^5$ and $R^6$ may be the same or different, plural $R^5$'s, if any, may be the same or different, and plural $R^6$'s, if any, may be the same or different; p and q indicate integers, each falling between 0 and 4; Z represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a bond of —S—, —SO—, —SO$_2$—, —O— or —CO—; and m falls between 1 and 150.

In the copolymer, the copolymerization ratio of the polyorganosiloxane may be any desired one. For optical materials to have well-balanced transparency, fluidity and stiffness, the copolymer is preferably so controlled that the molar ratio (molar fraction) of the organosiloxane units to the total of the organosiloxane units and the aromatic dihydroxy-carbonate units falls between 0.1 and 30 mol %, more preferably between 0.5 and 20 mol %. If the molar fraction is smaller than 0.1 mol %, the copolymer could hardly have good flame retardancy (on the level of V-0 in UV94); but if larger than 30 mol %, the non-reacted polyorganosiloxane will remain in the copolymer to detract from the transparency of the copolymer. If so, in addition, the copolymer will be difficult to mold, as the remaining, non-reacted polyorganosiloxane will often gel therein.

The aliphatic polyalcohol residue-containing polycarbonate copolymer of the invention is an aromatic polycarbonate copolymer which is produced through copolymerization of an aromatic dihydroxy compound and an aliphatic polyalcohol, and the amount of the monomers remaining in the copolymer is smaller than 100 ppm in terms of the total of the dihydroxy compound content, the dicarbonate content and the monohydroxy compound content of the copolymer.

The aliphatic polyalcohol residue-containing copolymer of the invention is an improvement on ordinary aromatic polycarbonates in point of its fluidity. This is especially favorable to optical materials, as being well molded into thin-walled moldings with good distortion resistance.

For its structure, the aliphatic polyalcohol residue-containing copolymer of the invention is a random copolymer which comprises units of an aromatic dihydroxy compound randomly copolymerized with an aliphatic polyalcohol via a carbonate group therebetween. In this, the molar ratio of the aliphatic polyalcohol units to the aromatic dihydroxy compound units may be any desired one. For optical materials to have well-balanced transparency, fluidity and stiffness, the copolymer is preferably so controlled that the molar fraction of the aliphatic polyalcohol units falls between 0.1 and 30 mol %, more preferably between 0.5 and 20 mol %. If the molar fraction is smaller than 0.1 mol, the fluidity of the copolymer will be poor. If so, the copolymer with such poor fluidity will be unfavorable to optical materials, as removing the optical distortion of its moldings will be difficult. On the other hand, if the molar fraction is larger than 30 mol %, the flexural stiffness of the copolymer will be poor. If so, the copolymer will be unfavorable to thin-walled optical members such as disc substrates, etc.

The copolymer of the invention generally has a viscosity-average molecular weight (Mv) falling between 12000 and 50000 or so. For optical materials, its Mv preferably falls between 12000 and 20000, more preferably between 13000 and 19000. If its Mv is smaller than 12000, the flexural stiffness of the copolymer will be poor; but if larger than 20000, the fluidity thereof will be poor, and precision injection molding of the copolymer will be difficult. If so, the copolymer will be unfavorable to optical materials.

The copolymer of the invention is so controlled that the amount of the monomers remaining therein is smaller than 100 ppm in terms of the dihydroxy compound content, the dicarbonate content and the monohydroxy compound content of the copolymer. These monomer components remaining in the copolymer are essentially derived from the starting monomers. If their content is larger than 100 ppm, the monomers will bleed out on the surface of the copolymer moldings to detract from the surface appearances of the moldings, and will soil the molds used in molding the copolymer. For optical materials, the monomers remaining in the copolymer have some negative influences on memory films and electroconductive films to be formed on the copolymer moldings.

Of the monomers remaining in the copolymer, the dihydroxy compound content is serious, and shall be smaller than 100 ppm. If its dihydroxy compound content is larger than 100 ppm, the copolymer will be unfavorable in view of its safety and sanitary aspects. On the other hand, the acetone soluble content of the copolymer is not larger than 3.0% by weight. The acetone-soluble substances that may be in the copolymer are essentially low-molecular-weight substances. If its acetone soluble content is larger than 3.0% by weight, the copolymer will be yellowed when molded. Especially for optical materials, the copolymer will be significantly yellowed when molded in high-temperature molding cycles, even though a thermal stabilizer is added thereto.

The cyclic oligomer content of the copolymer is not larger than 0.45% by weight. If it is larger than 0.45% by weight, the copolymer moldings will be yellowed and the copolymer will gel. Especially for optical materials, cyclic oligomers, if overstepping the defined range, in the copolymer will have direct negative influences on the properties of the optical members made of the copolymer.

On the other hand, the terminal hydroxyl fraction (this is derived from the starting aromatic dihydroxy compounds) of the copolymer is not larger than 20 mol %.

If its terminal hydroxyl fraction is larger than 20 mol %, the copolymer will be thermally degraded to yellow or will gel when molded, and the resulting moldings will have poor weather resistance. Especially for optical materials, the copolymer, if yellowed or gelled to have impurity agglomerates therein in early stages of molding, will have direct negative influences on the properties of the optical members made of it.

The method for identifying the structure of the copolymer, and the methods for measuring the remaining monomer content, the acetone soluble content, the cyclic oligomer content and the terminal hydroxyl fraction of the copolymer will be described hereinunder.

[II] Production Method
[Starting Materials]

In the invention, the polycarbonate copolymer is produced through transesterification of (A) an aromatic dihydroxy compound and (B) at least one member selected from the group consisting of polyorganosiloxanes and aliphatic polyalcohols with (C) a dicarbonate.

(A) Aromatic Dihydroxy Compound:

Preferred examples of the aromatic dihydroxy compound used herein as the component (A) include bis (hydroxyaryl) alkanes such as bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-t-butyl-4-hydroxy-3-methylphenyl)ethane, 1,1-bis(2-t-butyl-4-hydroxy-3-methylphenyl)ethane, 1-phenyl-1,1-bis(3-fluoro-4-hydroxy-3-methylphenyl)ethane, 2,2-bis(4-hydroxyphenyl)propane (generally referred to as bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-t-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl) propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 2,2-bis(3,5-dichloro-4-hydroxyphenyl)butane, 2,2-bis(3,5-dibromo-4-hydroxyphenyl)butane, 4,4-bis(4-hydroxyphenyl)heptane, 1,1-bis(2-t-butyl-4-hydroxy-5-methylphenyl)heptane, 2,2-bis(4-hydroxyphenyl)octane, 1,1-(4-hydroxyphenyl)ethane, etc.; bis(hydroxyaryl)cycloalkanes such as 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydoxyphenyl)cyclohexane, 1,1-bis(4-hydroxyphenyl)-3,5,5-trimethylcyclohexane, etc.; bis(hydroxyaryl) ethers such as bis(4-hydroxyphenyl) ether, bis(4-hydroxy-3-methylphenyl) ether, etc.; bis(hydroxyaryl) sulfides such as bis(4-hydroxyphenyl) sulfide, bis(3-methyl-4-hydroxyphenyl) sulfide, etc.; bis(hydroxyaryl) sulfoxides such as bis(4-hydroxyphenyl) sulfoxide, bis(3-methyl-4-hydroxyphenyl) sulfoxide, bis(3-phenyl-4-hydroxyphenyl) sulfoxide, etc.; bis(hydroxyaryl) sulfones such as bis(4-hydroxyphenyl) sulfone, bis(3-methyl-4-hydroxyphenyl) sulfone, bis(3-phenyl-4-hydroxyphenyl) sulfone, etc.; dihydroxybiphenyls such as 4,4'-dihydroxybiphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl, 3,3'-difluoro-4,4'-dihydroxybiphenyl, etc.

Apart from the above, also usable herein as the aromatic dihydroxy compound are dihydroxybenzenes, halogen and alkyl-substituted dihydroxybenzenes, etc. For example, they are resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,5-dichlorohydroquinone, 2,3,5,6-tetramethylhydroquinone, 2,3,4,6-tetra-t-butylhydroquinone, 2,3,5,6-tetrafluorohydroquinone, 2,3,5,6-tetrabromohydroquinone, etc.

In the production method of the invention, one or more of the compounds mentioned above are suitably selected and combined for the aromatic dihydroxy compound component (A). Of those, preferred is bisphenol A in view of its quality and stability.

(B) Polyorganosiloxane and Aliphatic Polyalcohol:

For polyorganosiloxanes for the component (B), herein referredtoaremodifiedpolyorganosiloxanes, whichthepresent applicant has clarified along with their production method in Japanese Patent Laid-Open No. 292113/1995. Briefly, the polyorganosiloxanes usable herein may have the polysiloxane skeleton of formula (1) terminated with hydroxyl groups at its both ends (formula (3)), or blocked with an alkyl carbonate group or an arylalkyl carbonate group at its one end (formula (4)).

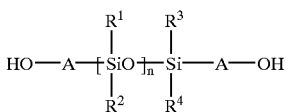
(3)

wherein $R^1$ to $R^4$, A and n have the same meanings as in formula (1).

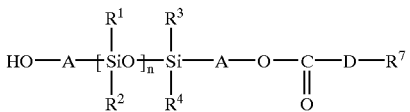
(4)

wherein $R^1$ to $R^4$, A and n have the same meanings as in formula (1); D represents a single bond or a bond of —O—; $R^7$ represents an alkyl group having from 1 to 20 carbon atoms, or an arylalkyl group having from 7 to 20 carbon atoms.

Concretely, the polysiloxane moiety in these polyorganosiloxanes includes polydimethylsiloxane, polydiethylsiloxane, polydiphenylsiloxane, polymethylphenylsiloxane, etc. The terminal hydroxyl group of the polyorganosiloxanes may be blocked with a methoxy group or a phenoxy group. Also usable herein are other monomers such as dimethoxydimethylsilane.

The component (B) serves to improve the flame retardancy and fluidity of the polycarbonate copolymer. As the component (B), preferred are polyorganosiloxanes of formula (1) where $R^1$ to $R^4$ are methyl groups, since they are inexpensive and have stable quality and therefore the polycarbonate copolymer containing any of them could have good fluidity and good thermal properties. As the component (B), one or more of the above-mentioned polyorganosiloxanes may be suitably selected and combined.

As the component (B), also usable are various types of aliphatic polyalcohols. They include, for example, 1,4-butanediol, 1,2-propanediol, 1,3-butanediol, 1,5-pentanediol, 1,5-hexanediol, 1,6-hexanediol, 2,2-dimethylpropane-1,3-diol, ethylene glycol, diethylene glycol, triethylene glycol, tetraethylene glycol, ocataethylene glycol, dipropylene glycol, N,N-methyldiethanolamine, cyclohexane-1,3-diol, cyclohexane-1,4-diol, 1,4-dimethylolcyclohexane, p-xylylene glycol, 2,2-bis(4-hydroxycyclohexyl)propane; as well as ethoxylated or propoxylated products of dihydric alcohols or phenols, such as bis-oxyethyl-bisphenol A, bis-oxyethyl-tetrachlorobisphenol A, bis-oxyethyl-tetrachlorohydroquinone, etc.

The component (B) serves to improve the fluidity of the polycarbonate copolymer. Of the aliphatic polyalcohols mentioned above for the component (B), most preferred are dihydric alcohols. Above all, 1,4-butanediol is preferred, as most effectively improving the fluidity and the thermal properties of the polycarbonate copolymer comprising it. For trihydric or higher polyhydric hydroxy compounds, they will be effective for improving the fluidity of the copolymer so far as their amount used is small, but with the increase in their amount used, they will rather lower the fluidity of the copolymer as the copolymer will be much crosslinked with them. As the component (B), one or more of the above-mentioned aliphatic polyalcohols may be suitably selected and combined.

(C) Dicarbonate:

Various types of dicarbonates may be used as the component (C). For example, the component (C) is at least one member selected from the group consisting of diaryl carbonates, dialkyl carbonates, and alkylaryl carbonates.

The diaryl carbonates include, for example, diphenyl carbonate, ditolyl carbonate, bis(chlorophenyl) carbonate, m-cresyl carbonate, dinaphthyl carbonate, bis(diphenyl) carbonate, bisphenol A bisphenyl carbonate, di-t-butylphenyl carbonate, dicumylphenyl carbonate, di-t-octylphenyl carbonate, etc. The dialkyl carbonates include, for example, diethyl carbonate, dimethyl carbonate, dibutyl carbonate, dicyclohexyl carbonate, bisphenol A bismethyl carbonate, etc.

The alkylaryl carbonates include, for example, methylphenyl carbonate, ethylphenyl carbonate, butylphenyl carbonate, cyclohexylphenyl carbonate, bisphenol A methylphenyl carbonate, methyl-t-butylphenyl carbonate, methylcumylphenyl carbonate, methyl-t-octylphenyl carbonate, etc.

In the invention, one or more of the above-mentioned dicarbonates may be suitably selected and combined for the component (C). Of those, preferred is diphenyl carbonate.

[Catalyst]

(Catalyst for Solid-phase Polymerization)

In the production method of the invention, a polycarbonate prepolymer is first prepared, and then polymerized in a solid or swollen phase in the presence of a quaternary phosphonium salt serving as a polymerization catalyst.

The quaternary phosphonium salt is not specifically defined, and may be any and every one. For example, preferably used are compounds of the following general formula (I) or (II):

 (I)

 (II).

In formulae (I) and (II), $R^{12}$ represents an organic group. The organic group includes, for example, an alkyl or cycloalkyl group such as a methyl group, an ethyl group, a propyl group, a butyl group, a pentyl group, a hexyl group, an octyl group, a cyclohexyl group, etc.; an aryl group such as a phenyl group, a tolyl group, a naphthyl group, a biphenyl group, etc.; and an arylalkyl group such as a benzyl group, etc. Four $R^{12}$'s may be the same or different ones, or two of them may be bonded to each other to form a cyclic structure. $X^1$ represents a group capable of forming a mono-valent anion, such as a halogen atom, a hydroxyl group, an alkyloxy group, an aryloxy group, R'COO, $HCO_3$, $(R'O)_2P(=O)O$, $BR''_4$ or the like. In those, R' represents a hydrocarbon group such as an alkyl group, an aryl group or the like, and two (R'O)s may be the same or different ones. R" represents a hydrogen atom, or a hydrocarbon group such as an alkyl group, an aryl group or the like, and four R"s may be the same or different ones. $Y^1$ represents a group capable of forming a di-valent anion, such as $CO_3$ or the like.

The quaternary phosphonium salts include, for example, tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide, etc.; as well as tetramethylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra(p-t-butylphenyl)phosphonium diphenyl phosphate, triphenylbutylphosphonium phenolate, triphenylbutylphosphonium tetraphenyl borate, etc.

Of the quaternary phosphonium salts noted above, preferred are those having alkyl groups, since they have high catalytic activity and since they are easily pyrolyzed and hardly remain in the polymers produced. For example, preferably used are tetramethylphosphonium methyltriphenyl borate, tetraethylphosphonium ethyltriphenyl borate, tetrapropylphosphonium propyltriphenyl borate, tetrabutylphosphonium butyltriphenyl borate, tetrabutylphosphonium tetraphenyl borate, tetraethylphosphonium tetraphenyl borate, trimethylethylphosphonium trimethylphenyl borate, trimethylbenzylphosphonium benzyltriphenyl borate, etc. Also preferred are tetraalkylphosphonium salts such as tetramethylphosphonium hydroxide, tetraethylphosphonium hydroxide, tetrabutylphosphonium hydroxide and others, as their decomposition temperature is relatively low and they are readily decomposed not remaining as impurities in the products, polycarbonates. In addition, since the number of carbon atoms constituting them is small, the scale of the unit batch for producing polycarbonates can be reduced. Therefore, they are preferred, as having the advantage of low production costs.

Except the compounds of formulae (I) and (II) mentioned above, also usable herein are bis-tetraphenylphosphonium salt of 2,2-bis(4-hydroxyphenyl)propane, and ethylenebis(triphenylphosphonium) dibromide, trimethylenebis(triphenylphosphonium)-bis(tetraphenyl borate), etc. Further usable are quaternary phosphonium salts having aryl groups and/or branched alkyl groups. For example, they are compounds of general formulae (III) and (IV):

$$(R^{13}{}_nPR^{14}{}_{4-n})^+(X^2)^- \qquad (III)$$

$$(R^{13}{}_nPR^{14}{}_{4-n})^+{}_2(Y^1)^{2-} \qquad (IV).$$

In formulae (III) and (IV);

n represents an integer of from 1 to 4.

$R^{13}$ represents at least one member selected from an aryl group and a branched alkyl group. The branched alkyl group has a structure of "$R_3C-$", in which R represents at least one member selected from a hydrogen atom, an alkyl group, a substituted alkyl group, an aryl group, and a substituted aryl group, and at least two of the three R's may be bonded to each other to form a cyclic structure. In this, however, two R's must not be hydrogens at the same time. For example, $R^{13}$ is a cycloalkyl group, a branched alkyl group such as an isopropyl group, a tert-butyl group, etc., or an arylalkyl group such as a benzyl group, etc.

When n is 2 or more, plural R's may be the same or different ones.

$R^{14}$ represents an alkyl group, a substituted alkyl group, an aryl group, or a substituted aryl group.

$X^2$ represents a group capable of forming a mono-valent anion, such as a halogen atom, a hydroxyl group, an alkyloxy group, an aryloxy group, R'COO, HCO$_3$, (R'O)$_2$P(=O)O, BR''$_4$ or the like. In those, R' represents a hydrocarbon group such as an alkyl group, an aryl group or the like, and two (R'O)s may be the same or different ones. R'' represents a hydrogen atom, or a hydrocarbon group such as an alkyl group, an aryl group or the like, and four R''s may be the same or different ones.

$Y^1$ represents a group capable of forming a di-valent anion, such as CO$_3$ or the like.

The quaternary phosphonium salts include, for example, tetra(aryl or alkyl)phosphonium hydroxides, such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetrahexylphosphonium hydroxide, etc.; mono(aryl or alkyl)triphenylphosphonium hydroxides, such as methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphthyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, naphthylphenylphosphonium hydroxide, etc.; mono(aryl)triphenylphosphonium hydroxides, such as phenyltrimethylphosphonium hydroxide, biphenyltrimethylphosphonium hydroxide, phenyltrihexylphosphonium hydroxide, biphenyltrihexylphosphonium hydroxide, etc.; diaryldialkylphosphonium hydroxides, such as dimethyldiphenylphosphonium hydroxide, diethyldiphenylphosphonium hydroxide, di(biphenyl)diphenylphosphonium hydroxide, etc.; tetraarylphosphonium tetraphenyl borates, such as tetraphenylphosphonium tetraphenyl borate, tetranaphthylphosphonium tetraphenyl borate, tetra(chlorophenyl)phosphonium tetraphenyl borate, tetra(biphenyl)phosphonium tetraphenyl borate, tetratolylphosphonium tetraphenyl borate, etc.; mono(aryl or alkyl)triphenylphosphonium tetraphenyl borates, such as methyltriphenylphosphonium tetraphenyl borate, ethyltriphenylphosphonium tetraphenyl borate, propyltriphenylphosphonium tetraphenyl borate, butyltriphenylphosphonium tetraphenyl borate, octyltriphenylphosphonium tetraphenyl borate, tetradecyltriphenylphosphonium tetraphenyl borate, benzyltriphenylphosphonium tetraphenyl borate, ethoxybenzyltriphenylphosphonium tetraphenyl borate, methoxymethyltriphenylphosphonium tetraphenyl borate, acetoxymethyltriphenylphosphonium tetraphenyl borate, phenacyltriphenylphosphonium tetraphenyl borate, chloromethyltriphenylphosphonium tetraphenyl borate, bromomethyltriphenylphosphonium tetraphenyl borate, biphenyltriphenylphosphonium tetraphenyl borate, naphthyltriphenylphosphonium tetraphenyl borate, chlorophenyltriphenylphosphonium tetraphenyl borate, phenoxyphenyltriphenylphosphonium tetraphenyl borate, acetoxyphenyltriphenylphosphonium tetraphenyl borate, naphthylphenyltriphenylphosphonium tetraphenyl borate, etc.; monoaryltrialkylphosphonium tetraphenyl borates, such as phenyltrimethylphosphonium tetraphenyl borate, biphenyltrimethylphosphonium tetraphenyl borate, phenyltrihexylphosphonium tetraphenyl borate, biphenyltrihexylphosphonium tetraphenyl borate, etc.; diaryldialkylphosphonium tetraphenyl borates, such as dimethyldiphenylphosphonium tetraphenyl borate, diethyldiphenylphosphonium tetraphenyl borate, di(biphenyl)diphenylphosphonium tetraphenyl borate, etc.

In addition, further employable herein are compounds of general formulae (V) and (VI):

$$((R^{15}-Ph)_n-PPh_{(4-n)})^+(X^3)^- \qquad (V)$$

$$((R^{15}-Ph)_n-PPh_{(4-n)})_2^+(Y^2)^{2-} \qquad (VI)$$

wherein $R^{15}$ represents an organic group, and plural $R^{15}$'s, if any, may be the same or different ones; $X^3$ represents a halogen atom, a hydroxyl group, an alkyloxy group, an aryloxy group, an alkylcarbonyloxy group, an arylcarbonyloxy group, $HCO_3$, or $BR_4$ (in which R represents a hydrogen atom or a hydrocarbon group, and four R's may be the same or different ones); Ph represents a phenyl group; $Y^2$ represents $CO_3$; and n represents an integer of from 1 to 4.

Specific examples of those quaternary phosphonium compounds include, for example, tetraphenylphosphonium hydroxide, biphenyltriphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenyl borate, biphenyltriphenylphosphonium tetraphenyl borate, methoxyphenyltriphenylphosphonium tetraphenyl borate, phenoxyphenyltriphenylphosphonium tetraphenyl borate, naphthylphenyltriphenylphosphonium tetraphenyl borate, tetraphenylphosphonium phenoxide, biphenyltriphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, biphenyltriphenylphosphonium chloride, methoxyphenyltriphenylphosphonium chloride, phenoxyphenyltriphenylphosphonium chloride, naphthylphenyltriphenylphosphonium chloride, etc.

Specific examples of branched alkyl-having quaternary phosphoniums include isopropyltrimethylphosphonium, isopropyltriethylphosphonium, isopropyltributylphosphonium, isopropyltriphenylphosphonium, tetraisopropylphosphonium, cyclohexyltriethylphosphonium, cyclohexyltrimethylphosphonium, cyclohexyltributylphosphonium, cyclohexyltriphenylphosphonium, tetracyclohexylphosphonium, 1,1,1-triphenylmethyltrimethylphosphonium, 1,1,1-triphenylmethyltriethylphosphonium, 1,1,1-triphenylmethyltributylphosphonium, 1,1,1-triphenylmethyltriphenylphosphonium, etc. Specific examples of counter anions for $X^3$ include hydroxide, borohydride, tetraphenylborate, acetate, propionate, fluoride, chloride, hydrocarbonate, etc. One example of $Y^2$ is carbonate. As specific examples of salts composed of a branched alkyl-having quaternary phosphonium (cation) and X or Y (anion), mentioned are various combinations of the specific examples for cations and anions noted above. For those, specifically mentioned are isopropyltrimethylphosphonium hydroxide, cyclohexyltriphenylphosphonium chloride, 1,1,1-triphenylmethyltriethylphosphonium acetate, bis(isopropyltriethylphosphonium) carbonate, etc.

Of those branched alkyl-having quaternary phosphonium salts, especially preferred are cyclohexyltriphenylphosphonium tetraphenyl borate and cyclopentyltriphenylphosphonium tetraphenyl borate, since their catalytic activity and the quality of polycarbonates to be produced are well balanced. Also mentioned for use herein are carboxylates such as tetraphenylphosphonium acetate, tetraethylphosphonium acetate, tetrapropylphosphonium acetate, tetrabutylphosphonium acetate, tetrapentylphosphonium acetate, tetrahexylphosphonium acetate, tetraheptylphosphonium acetate, tetraoctylphosphonium acetate, tetradecylphosphonium acetate, tetradodecylphosphonium acetate, tetratolylphosphonium acetate, tetraphenylphosphonium acetate, tetramethylphosphonium benzoate, tetraethylphosphonium benzoate, tetrapropylphosphonium benzoate, tetraphenylphosphonium benzoate, tetramethylphosphonium formate, tetraethylphosphonium formate, tetrapropylphosphonium formate, tetraphenylphosphonium formate, tetramethylphosphonium propionate, tetraethylphosphonium propionate, tetrapropylphosphonium propionate, tetramethylphosphonium butyrate, tetraethylphosphonium butyrate, tetrapropylphosphonium butyrate, etc.

It is desirable that the amount of metallic impurities in the quaternary phosphonium salts for use in the invention is as small as possible. Especially preferably, the amount of alkali metal and alkaline earth metal compounds in those salts is not larger than 50 ppm.

(Catalyst for Prepolymerization)

In the invention, an aromatic dihydroxy compound, at least one member selected from the group consisting of polyorganosiloxanes and aliphatic polyalcohols, and a dicarbonate are prepolymerized under heat to give a polycarbonate prepolymer, for which a nitrogen-containing, organic basic compound may be used as the polymerization catalyst. For the prepolymerization, also usable is a quaternary phosphonium salt. The nitrogen-containing, organic basic compound is not specifically defined, and may be any desired one. It includes, for example, aliphatic tertiary amine compounds such as trimethylamine, triethylamine, tripropylamine, tributylamine, tripentylamine, trihexylamine, dimethylbenzylamine, etc.; aromatic tertiary amine compounds such as triphenylamine, etc.; and nitrogen-containing heterocyclic compounds such as N,N-dimethyl-4-aminopyridine, 4-diethylaminopyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidazole, 2-dimethylaminoimidazole, 2-methoxyimidazole, 2-mercaptoimidazole, aminoquinoline, diazabicyclooctane (DABCO), etc.

In addition, further employable are quaternary ammonium salts of a general formula (VII):

$$(NR^1{}_4)^+(X^4)^- \qquad (VII).$$

In formula (VII), $R^1$ represents an organic-group, for example, an alkyl or cycloalkyl group such as a methyl group, an ethyl group, a propyl group, a butyl group, a pentyl group, a hexyl group, an octyl group, a cyclohexyl group, etc.; an aryl group such as a phenyl group, a tolyl group, a naphthyl group, a biphenyl group, etc.; or an arylalkyl group such as a benzyl group, etc. Four $R^1$'s may be the same or different ones; and two of them may be bonded to each other to form a cyclic structure. $X^4$ represents a halogen atom, a hydroxyl group, or $BR_4$, in which R represents a hydrogen atom, or a hydrocarbon group such as an alkyl group, an aryl group or the like, and four R's may be the same or different ones. Examples of the quaternary ammonium salts include, for example, ammonium hydroxides having alkyl, aryl and/or alaryl groups, such as tetramethylammonium hydroxide, tetraethylammonium hydroxide, tetrabutylammonium hydroxide, trimethylbenzylammonium hydroxide, etc.; and basic salts such as tetramethylammonium borohydride, tetrabutylammonium borohydride, tetrabutylammonium tetraphenyl borate, tetramethylammonium tetraphenyl borate, etc.

Of the nitrogen-containing, organic basic compounds noted above, preferred are the quaternary ammonium salts of formula (VII), concretely such as tetramethylammonium hydroxide, tetrabutylammonium hydroxide, tetramethylammonium borohydride, and tetrabutylammonium borohydride, since they have high catalytic activity and since they are easily pyrolyzed and hardly remain in the polymers produced. Of those, especially preferred is tetramethylammonium hydroxide. One or more of these nitrogen-containing, organic basic compounds are employable herein either singly or as combined. It is desirable that the amount of metallic impurities in the nitrogen-containing, organic basic compounds and in the quaternary ammonium salts for use in the invention is as small as possible. Especially preferably, the amount of alkali metal and alkaline earth metal compounds in those compounds is not larger than 50 ppm. For examples of the quaternary phosphonium salts herein usable as the catalyst, referred to are the same as those mentioned hereinabove for the solid-phase polymerization catalyst.

In the invention, it is desirable to use, as the polymerization catalyst, a quaternary phosphonium salt such as that mentioned above in an amount of from $10^{-8}$ to $10^{-2}$ mols, more preferably from $10^{-7}$ to $10^{-3}$ mols, relative to one mol of the starting aromatic dihydroxy compound of the component (A), and to use a nitrogen-containing, organic basic compound such as that mentioned above in an amount of from $10^{-8}$ to $10^{-2}$ mols, more preferably from $10^{-7}$ to $10^{-3}$ mols, relative to the same. If the amount of the quaternary phosphonium salt used is smaller than $10^{-8}$ mols, the catalytic activity in the latter stage of the reaction will be low; but if larger than $10^{-2}$ mols, the cost of the catalyst unfavorably increases. If the amount of the nitrogen-containing, organic basic compound used is smaller than $10^{-8}$ mols, the catalytic activity in the initial stage of the reaction will be low; but if larger than $10^{-2}$ mols, the cost of the catalyst unfavorably increases.

[Polymerization]

In the production method of the invention, ordinary starting compounds, an aromatic dihydroxy compound for the component (A), at least one member selected from the group consisting of polyorganosiloxanes and aliphatic polyalcohols for the component (B), and a dicarbonate for the component (C) are prepolymerized to give a prepolymer, and the resulting prepolymer is polymerized in a solid or swollen solid phase in the presence of a quaternary phosphonium salt serving as a catalyst to give a high-quality polycarbonate copolymer. Concretely, the process may be conducted through known transesterification. Preferred embodiments of the process and the procedures and conditions for them are described concretely hereunder.

(Prepolymerization)

In production method of the invention, the prepolymer prepared in the prepolymerization step is crystallized, and then polymerized in a solid phase. In the prepolymerization step, an aromatic dihydroxydiaryl compound, at least one member selected from the group consisting of polyorganosiloxanes and aliphatic polyalcohols, and a diaryl carbonate are prepolymerized under heat, preferably in the presence of at least one compound selected from the prepolymerization catalysts mentioned above, to give a prepolymer with the aromatic monohydroxy compound formed being released from the reaction system. This reaction is a competent reaction of the diaryl carbonate and the aromatic dihydroxydiaryl compound with at least one member selected from the group consisting of polyorganosiloxanes and aliphatic polyalcohols. In this, where there is no difference in the reactivity between the two hydroxy compounds used, the aromatic polycarbonate copolymer produced will have organosiloxane units and aliphatic polyalcohol units randomly bonded to the constituent units of the copolymer.

The weight-average molecular weight of the prepolymer prepared in the prepolymerization step preferably falls between 2000 and 20000, more preferably between 2500 and 15000, even more preferably between 4000 and 12000. If its weight-average molecular weight is smaller than 2000, the prepolymer will unfavorably take a long time for solid-phase polymerization. On the other hand, there is little necessity for the prepolymer to have a weight-average molecular weight of larger than 20000. In progress of polycondensation to give the prepolymer, the terminal hydroxyl groups in the prepolymer are substituted to be phenyl carbonate groups. Therefore, the terminal ratio in the prepolymer to be prepared in the prepolymerization step shall be settled depending on the molecular weight of the prepolymer and on the molecular weight of the final product, polycarbonate copolymer. One standard example for it is mentioned. Where the prepolymer has a viscosity-average molecular weight (Mv) of 7000 and is polymerized into a final product, a polycarbonate copolymer having a molecular weight of 20000, the ratio of phenyl carbonate terminal/hydroxyl terminal in the prepolymer shall be 7/3.

If the terminal ratio in the prepolymer oversteps the defined range, the molecular weight of the final product, polycarbonate copolymer will be limited and the molecular weight of the final product will be difficult to increase. The terminal hydroxyl groups in the prepolymer may be derived from polyorganosiloxanes or from aromatic dihydroxy compounds.

Preferably, the starting compounds are prepolymerized in melt to give the prepolymer. The melt viscosity of the prepolymer is not so high so far as the molecular weight thereof falls within the defined range as above. Therefore, industrial-scale prepolymerization to give the prepolymer is easy. Needless-to-say, the prepolymerization may be effected in a solvent which is inert to reaction, for example, in any of methylene chloride, chloroform, 1,2-dichloroethane, tetrachloroethane, dichlorobenzene, tetrahydrofuran, diphenylmethane, diphenyl ether or the like. In general, however, the starting compounds are prepolymerized in the absence of a solvent or in melt.

In the prepolymerization, the ratio of the diaryl carbonate (C) to the total of the dihydroxydiaryl compound (A) and at least one member selected from the group consisting of polyorganosiloxanes and aliphatic polyalcohols (B) (that is, the feeding ratio of the starting compounds) varies, depending on the type of the dihydroxydiaryl compound used, the type of at least one member selected from the group consisting of polyorganosiloxanes and aliphatic polyalcohols used, and the type of the diaryl carbonate used, and also on the reaction temperature and other reaction conditions. In general, however, the amount of the diaryl carbonate falls between 0.9 and 2.5 mols, but preferably between 0.95 and 2.0 mols, more preferably between 1.01 and 1.5 mols, relative to one mol of the total of the dihydroxydiaryl compound and at least one member selected from the group consisting of polyorganosiloxanes and aliphatic polyalcohols.

The ratio of the component (B), at least one member selected from the group consisting of polyorganosiloxanes and aliphatic polyalcohols, to the dihydroxydiaryl compound (A) (that is, the feeding ratio of the two components) depends on the intended ratio of the polyorganosiloxane units or the aliphatic polyalcohol units that shall be in the final product, polycarbonate copolymer. Naturally, it varies, depending on the type of the diaryl carbonate used and the type of at least one member selected from the group consisting of polyorganosiloxanes and aliphatic polyalcohols used, and also on the reaction temperature and other reaction conditions. Concretely, the ratio (in terms of the molar fraction) of the polyorganosiloxane units or the aliphatic polyalcohol units that shall be in the final product, polycarbonate copolymer, may fall between 0.1 and 30 mol %, and the amount of at least one member selected from the group consisting of polyorganosiloxanes and aliphatic polyalcohols may fall generally between 0.001 and 0.30 mols, but preferably between 0.005 and 0.20 mols, relative to one mol of the dihydroxydiaryl compound. In some reaction conditions, a part or all of some reactant components will distill out in the course of prepolymerization. In that case, the reactant components may be added to the prepolymerization system to keep the predetermined reactant ratio.

The reaction temperature and the reaction time for the prepolymerization vary, depending on the type and the amount of the starting compounds used, the dihydroxydiaryl compound, at least one member selected from the group consisting of polyorganosiloxanes and aliphatic dialcohols, and the diaryl carbonate, on the type and the amount of the catalyst optionally used, on the necessary degree of polymerization of the prepolymer to be formed, and on the other reaction conditions. The reaction temperature preferably falls between 50 and 350° C., more preferably between 100 and 320° C.; and the reaction time preferably falls between 1 minute and 100 hours, more preferably between 2 minutes and 10 hours. In order not to discolor the prepolymer prepared, it is desirable that the temperature for the prepolymerization is as low as possible and the time for it is as short as possible. Especially preferably for that purpose, the reaction temperature falls between 150 and 280° C., and the reaction time falls between a few minutes and a few hours. The prepolymer to be prepared through the prepolymerization may have a relatively low molecular weight. Under the condition defined-above, the intended prepolymer having the necessary degree of polymerization is easy to prepare.

In progress of the prepolymerization, an aromatic monohydroxy compound is formed, which is a compound having a hydroxyl group bonded to the aryl group as derived from the diaryl carbonate used. Removing this from the reaction system promotes the reaction. For this, preferably employed is a method of effectively agitating the reaction system with introducing an inert gas, such as nitrogen, argon, helium, carbon dioxide or the like, or a lower hydrocarbon gas into the system, thereby to remove the aromatic monohydroxy compound along with the gas; a method of effecting the reaction under reduced pressure; or a combination of these methods.

The reactor for the step of preparing the prepolymer may be any known polymerization reactor. For example preferred are vertical reactors or horizontal reactors equipped with a stirrer and with a jacket, an outer heat exchanger or the like for temperature control. The reaction may be effected in one stage or in plural stages. One reactor may be used, or plural reactor may be connected in series or in parallel. The reaction maybe effected in a batch wise process or in a continuous process, or even in their combination. In view of the productivity, a continuous process is preferred. In the step of preparing the prepolymer, it is important to prevent the dicarbonate, of which the vapor pressure is high and is next to that of phenols, from distilling out of the reaction system. For this, some specific method must be employed. For example, the starting compounds, the dihydroxy compound and the dicarbonate, are melted together or separately, and fed into the reactor; or a powder of the dicarbonate is added to a melt of the dihydroxy compound to prepare a melt of the two. The behavior of the non-reacted dicarbonate is closely related with the ambient temperature and pressure. For example, the non-reacted dicarbonate distills out more easily at higher temperatures and in higher vacuum. Therefore, for controlling the temperature and pressure condition for the reactor, the reaction speed is previously calculated from the distillation rate of phenols and the viscosity of the prepolymer, and the resulting data are fed back for the reaction condition control. In order to reduce dicarbonate distillation, it is also desirable to dispose a reflux tower or a distillation tower between the reactor and the condenser.

(Flaking of Prepolymer)

The prepolymer may be flaked, for which the method is not specifically defined. Preferably, it may be flaked through processing in solvents or through crystallization under heat. In the former solvent method, the prepolymer is flaked in suitable solvents. Concretely, preferred solvents for the method are aliphatic halogenohydrocarbons such as chloromethane, methylene chloride, chloroform, carbon tetrachloride, chloroethane, dichloroethane (of all types), trichloroethane (of all types), trichloroethylene, tetrachloroethylene (of all types), etc.; aromatic halogenohydrocarbons such as chlorobenzene, dichlorobenzene, etc.; ether compounds such as tetrahydrofuran, dioxane, etc.; ester compounds such as methyl acetate, ethyl acetate, etc.; ketone compounds such as acetone, methyl ethyl ketone, etc.; aromatic hydrocarbons such as benzene, toluene, xylene, etc. In the method, one or more of these solvents may be used either singly or as combined. The amount of the solvent to be used for processing the prepolymer varies, depending on the type of the prepolymer and the solvent, the necessary degree of crystallization of the prepolymer, the processing temperature, etc., but preferably falls between 0.05 and 100 times, more preferably between 0.1 and 50 times the weight of the prepolymer.

The other method of crystallization under heat is to crystallize the prepolymer by heating it at a temperature not lower than the glass transition temperature of the intended final product, aromatic polycarbonate copolymer, but lower than the temperature at which the prepolymer begins to melt. In this method, the prepolymer is readily crystallized merely by heating it. Therefore, the method is favorable to industrial processing. Quite unexpectedly, even substantially amorphous prepolymers having a relatively low molecular weight and having an aryl carbonate terminal ratio of larger than 50 mol % relative to the total terminal groups therein could be crystallized in the simple method. The temperature Tc (° C.) at which the prepolymer is crystallized under heat is not specifically defined, so far as it is not lower than the glass transition temperature of the intended final product, aromatic polycarbonate copolymer, but lower than the melting temperature Tm (° C.) of the prepolymer. However, at too low temperatures, the crystallization of the prepolymer is retarded. Therefore, the temperature Tc (° C.) at which the prepolymer is crystallized under heat preferably falls the following range:

$$Tm-50 \leq Tc < Tm \qquad (VIII).$$

For crystallizing it under heat, the prepolymer may be kept at a constant temperature falling within the defined range, or its temperature may be continuously or discontinuously varied within it, or the two methods may be combined. In the method of varying the temperature of the prepolymer being processed, in general, the melting temperature of the prepolymer gradually increases with the increase in the degree of crystallization of the prepolymer. Therefore, in the method, it is especially desirable that the prepolymer to be crystallized is gradually heated in accordance with the increase in the melting temperature of the prepolymer. The method where the temperature of the prepolymer being crystallized under heat is varied is preferred to the other method where the prepolymer is kept at a constant temperature, since the crystallization rate of the prepolymer is higher in the former and since the melting temperature thereof could be higher therein. The time for crystallization under heat varies, depending on the chemical composition of the prepolymer, the presence or absence of a catalyst, the crystallization temperature and the crystallization method, but preferably falls between 1 and 200 hours. After having been subjected to the treatment for crystallization, the prepolymer loses transparency, by which the crystallized prepolymer is readily identified. Needless-to-say, the crystallized prepolymer is also identified by X-ray diffractiometry.

As the case may be, other known methods for flaking the prepolymer are also employable herein. They include, for example, rolling granulation, extrusion granulation, compression granulation, melt granulation, spray-drying granulation, fluidized bed granulation, milling granulation, stirring granulation, liquid-phase granulation, vacuum drying granulation, etc. The shape of the prepolymer flakes is not specifically defined. In view of their handlability, preferred are pellets, beads, granules or powders. Also preferred are aggregates of fine grains, and porous grains. For these, preferably employed are methods of forming and/or aggregating fine grains. Preferably, the fine grains have a specific surface area of at least 0.15 m$^2$/g. A stirring granulation method is also effective, which comprises once dissolving the prepolymer in a swelling solvent followed by flaking it while a bad solvent to polycarbonates is added thereto. Before polymerizing them, the prepolymer flakes do not need to be specifically dried.

The size of the prepolymer flakes depends on the operability thereof and on the gas flow rate, and generally falls between 10 microns and 10 cm or so, but preferably between 100 microns and 1 cm. If the flakes are smaller than the defined range, fine powder will scatter in the reaction system while gas is introduced thereinto, and it will clog the valves and the pipe lines and will often have some negative influences on the solvent recovering step. If, on the other hand, the flakes are larger than the defined range, the flowing gas will diffuse too much whereby the reaction time will be prolonged. The flaking condition varies, depending on the molecular weight of the prepolymer, on the granulation method, and even on the type and the boiling point of the solvent, if used. The shape of the flakes is not specifically defined for preferred use. However, large lumps are undesirable as their reaction speed is low and they are difficult to handle. Therefore, preferred are pellets, beads, granules, powders and the like. Also preferably, solids of the crystallized prepolymer may be ground into grains having a suitable size. The prepolymer having been crystallized through treatment with solvents is generally in the form of porous granules or particulates. The porous prepolymer is especially preferred, as the aromatic monohydroxy compound to be formed as the side product in solid-phase polymerization of the prepolymer is easy to remove.

(Solid-phase Polymerization)

The prepolymer is polymerized in a solid phase. In the solid-phase polymerization step, the solid prepolymer is polymerized in the presence of a solid-phase polymerization catalyst. The solid-phase catalyst may be added to the system along with the prepolymerization catalyst in the previous prepolymerization step, or may be added thereto after the prepolymerization step.

Removing the side product, aromatic monohydroxy compound from the system promotes the reaction. For this, preferably employed is a method of introducing an inert gas, such as nitrogen, argon, helium, carbon dioxide or the like, or a lower hydrocarbon gas into the system, thereby to remove the aromatic monohydroxy compound along with the gas; a method of effecting the reaction under reduced pressure; or a combination of these methods. Before being introduced into the system, the gas is preferably heated up to around the reaction temperature.

The reaction temperature, Tp (° C.), and the reaction time for the solid-phase polymerization shall vary, depending on the type (including the chemical structure, the molecular weight) and the shape of the crystallized prepolymer, the presence or absence of the catalyst in the crystallized prepolymer, the type and the amount of the catalyst therein, the type and the amount of an additional catalyst that may be optionally added to the system, the degree of crystallization of the crystallized prepolymer, the melting temperature Tm' (° C.) of the crystallized prepolymer, the necessary degree of polymerization of the intended final product, aromatic polycarbonate copolymer, and other reaction conditions. Concretely, it is desirable that the prepolymer is polymerized in a solid phase while being heated at a temperature not lower than the glass transition temperature of the intended final product, aromatic polycarbonate copolymer and falling within the range within which the crystallized prepolymer being polymerized does not melt but could be all the time in a solid phase or in a swollen solid phase, more preferably falling within the range to be indicated by the following formula:

$$Tm'-50 \leq Tc < Tm' \quad (IX),$$

for 1 minute to 100 hours, more preferably for 0.1 to 50 hours or so. For example, when a polycarbonate of bisphenol A is produced, the temperature range is preferably from about 150 to 260° C., more preferably from 180 to 230° C.

In the solid-phase polymerization step, the system is preferably stirred in order that the prepolymer being polymerized could be heated as uniformly as possible and that the side product, aromatic monohydroxy compound could be removed from the system as smoothly as possible. For this, for example, preferably employed is a stirring blade, or a reactor capable of rotating by itself. Also preferred is fluidizing the system by introducing hot gas thereinto. Where the prepolymer is crystallized under heat, the heating operation to achieve the predetermined degree of crystallization of the prepolymer may be followed by reducing the pressure in the system while hot gas (this is to remove the side product, aromatic monohydroxy compound from the system along with it) is introduced into the system to attain the removal of the aromatic monohydroxy compound during the solid-phase polymerization of the prepolymer.

In general, aromatic polycarbonates favorable to industrial use have a weight-average molecular weight of from 6000 to 200000 or so, preferably from 10000 to 50000 or so, more preferably from 13000 to 40000 or so. In the solid-phase polymerization as herein, polycarbonates having a degree of polymerization within that range are easy to produce. The shape of the aromatic polycarbonate copolymer thus produced herein through solid-phase polymerization may depend on the shape of the crystallized prepolymer used, but the copolymer is generally powdery, for example, in the form of beads, granules or particulates. The degree of crystallization of the aromatic polycarbonate copolymer to be obtained through solid-phase polymerization of the crystallized prepolymer is generally larger than that of the starting prepolymer. Therefore, the product obtained in the method of the invention is generally a crystalline, aromatic polycarbonate copolymer powder. Needless-to-say, the crystalline aromatic polycarbonate copolymer powder thus produced through solid-phase polymerization and having a predetermined uniform molecular weight could be directly pelletized in an extruder, without being cooled, or could be directly molded in a molding machine also without being cooled.

According to the method of the invention comprising prepolymerization followed by solid-phase polymerization as above, the aromatic polycarbonate copolymer produced could have a desired mean molecular weight and a predetermined copolymerization ratio of polyorganosiloxane units or aliphatic alcohol residue units/aromatic dihydroxy residue units. In the invention, the ratio of the degree of polymerization that participates in the following polymerization to the degree of solid-phase polymerization could be varied in a broad range. Regarding the type of the reactors for the invention, any of batchwise reactors, continuous reactors or even combined batchwise/continuous reactors may be used anywhere in the prepolymerization step, the crystallization step and the solid-phase polymerization step. In the prepolymerization step, the prepolymer to be prepared generally has a relatively low molecular weight, and therefore does not require any expensive reactors for high-viscosity fluids. In the crystallization step, the prepolymer to be crystallized is simply processed in a solvent or is simply heated, and therefore does not require any specific apparatus. In the solid-phase polymerization step, the apparatus to be used may be any ordinary one capable of heating the substantially crystallized prepolymer while removing the side product, aromatic monohydroxy compound from the system, and any specific apparatus is unnecessary.

[Method of Swollen Solid-phase Polymerization]

The second method of the invention comprises crystallizing the flaked prepolymer followed by polymerizing it in a mode of swollen solid-phase polymerization. This is combined with transesterification to give the intended polycarbonate copolymer, in which the side products, low-molecular compounds such as phenols are removed through evaporation or extraction. For this, the low-molecular compounds are evaporated away or extracted out, while being separated from the high-molecular compound (prepolymer) having been swollen by a swelling gas introduced into the system. This is based on the principle that the removal of low-molecular compounds from swollen prepolymers through evaporation or extraction is more effective than that from high-viscosity prepolymer melts or from crystallized solid prepolymers, as the substance mobility rate is higher and the reaction efficiency is higher in the former than in the latter.

The second method of the invention includes a prepolymerization step to give a prepolymer having a viscosity-average molecular weight of from 2000 to 20000 or so, a step of flaking the prepolymer, and a molecular weight-increasing step of polymerizing the resulting flaky prepolymer in a solid phase in a swelling solvent stream (this is a swollen solid-phase polymerization step). For this, the prepolymerization step to give the prepolymer and the step of flaking the prepolymer may be effected in the same manner as mentioned hereinabove.

(Step of Swollen Solid-phase Polymerization)

In the molecular weight-increasing step (that is, in the swollen solid-phase polymerization step), the prepolymer flakes are polymerized into a polymer having an increased molecular weight while they are kept in a solid phase or in a swollen solid-phase. This step is characterized in that the flaky prepolymer is polymerized in a swollen solid phase in a swelling solvent atmosphere while the side products, phenols are removed from the system. The advantages of the process including this step are that the intended polymerization could be effected at lower temperatures as compared with ordinary melt transesterification, and that the time for the polymerization could be significantly shortened as compared with that for ordinary solid-phase polymerization or melt transesterification. The swelling solvent to be used herein is meant to include single solvents capable of swelling polycarbonates by themselves under the reaction conditions that will be mentioned below; mixtures of two or more such solvents; and mixtures to be prepared by adding one or more of bad solvents for polycarbonates to the single solvents or their mixtures. In the polymerization system containing the swelling solvent, the swelling solvent shall exist all the time under the reaction conditions that will be mentioned below. The swelling solvent may contain a bad solvent for polycarbonates, and the bad solvent is to control the swelling condition of the system. The swollen condition in this step is meant to indicate that the starting prepolymer flakes are swollen by volume or weight at least to a degree not lower than the thermal swell thereof under the reaction conditions to be mentioned below. The swelling solvent is a single compound having a boiling point at which it can completely vaporize within the range of the following reaction conditions or having a vapor pressure of generally not lower than 50 mmHg, preferably not lower than 200 mmHg under those reaction conditions, or a mixture of such compounds, and it can form the swollen condition defined above.

The swelling solvent for use herein is not specifically defined, so far as it satisfies the swelling conditions noted above. For example, aromatic compounds and oxygen-containing compounds having a solubility parameter of generally from 4 to 20 $(cal/cm^3)^{1/2}$, preferably 4 $(cal/cm^3)^{1/2}$ belong to the category of the swelling solvent. Those having a solubility parameter of larger than 15 $(cal/cm^3)^{1/2}$ will participate in transesterification. Therefore, solvents having a functional group with relatively high hydrogen-bonding capabilities, such as a hydroxyl group, a carboxyl group, an amino group, an amido group, a cyano group, a nitro group or the like must not be used herein. From the environmental aspects, using halogen-containing solvents is unfavorable. Concretely, the swelling solvent for use in the invention includes, for example, aromatic hydrocarbons such as benzene, toluene, xylene, ethylbenzene, diethylbenzene, propylbenzene, dipropylbenzene, etc.; ethers such as tetrahydrofuran, dioxane, etc.; ketones such as methyl ethyl ketone, methyl isobutyl ketone, etc. Of those; preferred are single compounds of aromatic hydrocarbons having from 6 to 20 carbon atoms, and their mixtures. Regarding its conditions, the bad solvent to be mixed with the swelling solvent shall be such that the solubility of the product, polycarbonate copolymer in it is at most 0.1% by weight under the reaction conditions to be mentioned below and that it participates little in the reaction. Preferred examples of the bad solvent are linear or branched, saturated hydrocarbon compounds having from 4 to 18 carbon atoms, or hydrocarbon compounds unsaturated to a low degree and having from 4 to 18 carbon atoms. If the boiling point of the swelling solvent and that of the bad solvent are both above 250° C., the residual solvents will be difficult to remove from the product, polycarbonate copolymer, and the quality of the product will be poor. Therefore, using solvents having such a high boiling point is unfavorable. Where a mixture of the bad solvent and the swelling solvent is used herein, the proportion of the swelling solvent shall be at least 1% by weight of the mixed solvent, but preferably at least 5% by weight thereof.

In the swollen solid-phase polymerization step, the reaction temperature preferably falls between 100 and 240° C., more preferably between 150 and 220° C., and the reaction pressure preferably falls between 10 Torr and 5 kg/cm$^2$G, but is more preferably not higher than the atmospheric pressure. If the reaction temperature is lower than the defined range, the prepolymer could not undergo transesterification. On the other hand, however, if the reaction is effected at high-temperature conditions exceeding the melting point of the prepolymer, the reaction system could not keep a solid phase or a swollen solid phase, and the prepolymer grains will fuse together at such high temperatures. If so, the operability to continue the reaction will be greatly lowered. Therefore, the reaction temperature must not be higher than the melting point of the prepolymer. As the reaction catalyst in the swollen solid-phase polymerization step, used is a quaternary phosphoriium salt and optionally any other catalyst. The reaction catalyst having been added to and still remaining in the prepolymerization system could act, as it would be, further in the swollen solid-phase polymerization step, but, as the case may be, an additional catalyst such as that mentioned above may be added to the swollen solid-phase polymerization system. The additional catalyst may be powdery, liquid or gaseous. If desired, a terminal stopper and an antioxidant such as those mentioned above may be added to the reaction system, and they may be powdery, liquid or gaseous. Adding them will improve the quality of the product, polycarbonate copolymer.

Regarding the mode of feeding the swelling solvent gas into the polymerization system, the liquid solvent may be directly fed into the reactor and is vaporized therein; or the liquid solvent is, after having been previously vaporized by the use of a heat exchanger or the like, fed into the reactor. Regarding the direction in which the swelling gas stream passes in the reactor, the swelling gas may flow in the vertical direction in the reactor while being fed thereinto through its top or its bottom, or may also be in the horizontal direction therein, so far as the ambient atmosphere around the prepolymer in the reactor could be well purged with the swelling gas. Depending on its shape, the reactor may have one or more gas feeding ports. Different types of gas-flowing modes may be combined, or the area where the gas flow passes may be limited. The flow rate of the swelling gas solvent may be at least $1 \times 10^{-3}$ cm/sec, but is preferably at least $1 \times 10^{-3}$ cm/sec. The amount of the swelling gas to be fed into the reactor is preferably at least 0.5 liters (normal condition)/hr/g of prepolymer. The flow rate of the swelling gas solvent is closely related with the reaction rate. The swelling gas solvent acts to remove phenols and serves as a heat medium, and the reaction rate increases with the increase in the gas flow rate.

Owing to its capability to serve as a heat medium, the swelling gas acts to reduce the temperature difference between the heat-conducting member around the reactor, such as the jacket or the like therearound, and the powder existing in the reactor, thereby preventing the powder from fusing in the area adjacent to the heat-conducting member.

The reactor to be used herein for such swollen solid-phase polymerization is not specifically defined, and may be any one including, for example, stirrer-combined reactors, tumbler-type reactors, kiln-type reactors, paddle drier-type reactors, screw conveyor-type reactors, shaking reactors, fluidized bed-type reactors, fixed bed-type reactors, mobile bed-type reactors, etc. These reactors may be used either singly or as combined. The polycarbonate copolymer of which the molecular weight has been increased in the manner as above may be dried and pelletized in any known manner with no limitation. When additives such as those mentioned above are added to the copolymer product, some preferred methods are employed; for example, additive powder may be directly added to the flaky product before or after the product is dried; or additive liquid may be sprayed over the product; or additive vapor may be applied thereto so that the product could absorb it. Apart from the methods, additives may be added to the copolymer product in an extruder before the product is pelletized.

The inert gas that may be used in this step is not specifically defined, including, for example, nitrogen, carbon dioxide, argon, helium, and also saturated or unsaturated lower hydrocarbons such as methane, ethane, propane, ethylene, propylene, etc. The gas may be a single gas or a mixed gas of two or more different types of gases. The blend ratio of the inert gas to the swelling solvent may be such that the swelling solvent accounts for at least 1% by volume of the mixed solvent gas, but preferably at least 5% by volume thereof.

In the second method of the invention mentioned above, the reaction rate is higher than that in ordinary melt transesterification methods even at lower temperatures, and the reaction time could be reduced to ½ of the reaction time which ordinary melt transesterification will take, or even shorter than it. According to this method, it is easy to produce high-quality polycarbonate copolymers having a viscosity-average molecular weight of around 100,000 or so.

EXAMPLES

The invention is described in more detail with reference to the following Examples.

In the following Examples, the polymer samples produced were tested according to the methods mentioned below.

[Measurement of the Molar Ratio of the Aliphatic Alcohol Residues to the Aromatic Dihydroxy Residues Bonded to the Former via a Carbonate Group Therebetween in Polymers]

Polymer samples are subjected to $^1$H—NMR (500 MHz, 256 integration cycles), for which is used $CD_2Cl_2$ as the solvent. The $^1$H—NMR peaks are integrated to give an integrated ratio, which indicates the molar ratio of the residues in the sample.

[Measurement of Remaining Monomers]

The dihydroxy compound content, the dicarbonate content and the phenol content of each polymer sample are measured through high-performance liquid chromatography in the manner mentioned below.

2 g of a polycarbonate sample is dissolved in 50 ml of dichloromethane, and 250 ml of acetone is added thereto little by little so as to deposit the polymer in the solution. This is filtered under suction, and 50 ml of acetonitrile is added to the filtrate. This is concentrated to about 10 ml. The resulting concentrate is put into a 50-ml messflask, and water is added thereto so as to have a ratio, acetonitrile/water=1/1 (by volume). This is filtered through a chromatography disc, 13P, and subjected to high-performance liquid chromatography (HPLC). The condition for HPLC is as follows:

The column is Finepack SIL S. No. 1033610107. The mobile phase is comprised of isooctane and aqueous acetonitrile solution (liquid A) (methylene chloride/acetonitrile= 9/1, by volume), in which the ratio of the two is varied from 90/10 (by volume) to 40/60 (by volume). With so varying the molar ratio, 20 μl of the mixture for the mobile phase is introduced into the column over a period of 50 minutes, at a flow rate of 1.5 ml/min. For recording the data, a UV detector (wavelength: 254 nm) is used.

[Measurement of Acetone Soluble Content]

3 g of polycarbonate flakes having passed through a 100-mesh wire gauze are put into a cylindrical paper filter No. 84 (28 mm×100 mm), and extracted with 100 ml of acetone for 8 hours while being refluxed at intervals of once for 3 to 4 minutes (20 ml/once). Next, 100 ml of acetone is evaporated away, and the residue is dried overnight in vacuum at 110° C., and its weight is measured. This indicates the acetone soluble content of the polycarbonate sample tested.

[Measurement of Terminal Hydroxyl Fraction]

To measure its terminal hydroxyl fraction, each polycarbonate sample is subjected to $^1$H—NMR (500 MHz, 256 integration cycles), for which is used $CD_2Cl_2$ as the solvent. On the $^1$H—NMR chart, Ha and He are read, from which the terminal hydroxyl fraction of the sample is obtained according to the following equation:

$$\text{Terminal hydroxyl fraction} = (Ha/2)/(Ha/2+He/2)$$

wherein Ha indicates the integrated ratio of the peaks derived from two hydrogens that are ortho-positioned in the benzene ring of the terminal phenyl group relative to the OH group bonding to the group; He indicates the integrated ratio of the peaks derived from two hydrogens that are meta-positioned in the benzene ring of the terminal phenylcarbonate group relative to COO bonding to the group.

[Measurement of Dimethylsiloxane Units]

Polymer samples are subjected to $^1$H—NMR (500 MHz, 256 integration cycles), for which is used $CD_2Cl_2$ as the solvent. The $^1$H—NMR peaks are integrated to give an integrated ratio, which indicates the dimethylsiloxane unit content of the sample.

[Cyclic Oligomer]

2 g of a polycarbonate sample is dissolved in 50 ml of dichloromethane, and 250 ml of acetone is added thereto little by little so as to deposit the polymer in the solution. This is filtered under suction, and the filtrate is dried up to be solid. The solid is dissolved in 50 ml of diethyl ether, and then filtered under normal pressure. The filtrate is again dried up to be solid, to which is added chloroform to have a constant volume of 20 ml. This is filtered through a chromatography disc, 13P, and subjected to high-performance liquid chromatography. The condition for HPLC is as follows: The column is a Nippon Bunko's Finepack SIL S (No. 1033610107). The mobile phase is comprised of isooctane (liquid A) a mixture of methylene chloride and acetonitrile (liquid B) (methylene chloride/acetonitrile=9/1, by volume). In the mobile phase, the ratio of liquid A/liquid B is varied from 90/10 (by volume) to 40/60 (by volume). With so varying the molar ratio, 10 μl of the mixture for the mobile phase is introduced into the column over a period of 50 minutes, at a flow rate of 1.5 ml/min. For recording the data, a UV detector (wavelength: 254 nm) is used.

Example 1

228 g (1.0 mol) of bisphenol A (BPA), 5.1 g (0.063 mols in terms of organosiloxane unit) of polydimethylsiloxane (of formula (5)), 257 g (1.20 mols) of diphenyl carbonate, and 0.5 mmols of tetramethylammonium hydroxide (TMAH) were put into a one-liter nickel autoclave equipped with a stirrer, which was then purged five times with argon gas. Next, the mixture was heated at 190° C., and reacted for 30 minutes in the argon atmosphere. This was gradually heated up to 235° C. and reacted for 60 minutes with being vacuumed up to a vacuum degree of 60 mmHg; then this was further heated gradually up to 270° C. and reacted for 120 minutes with being vacuumed up to a vacuum degree of 10 mmHg; then this was still further reacted at that temperature of 270° C. for 30 minutes with being vacuumed up to a vacuum degree of 1 mmHg; and finally, this was still further reacted at that temperature for 30 minutes with being vacuumed up to a vacuum degree of 0.5 mmHg. After the reaction, the reactor was restored with argon to have an atmospheric pressure, and the prepolymer formed therein was taken out, and ground. The prepolymer had a viscosity-average molecular weight of 10900, and a terminal hydroxyl fraction of 30%.

The prepolymer was dissolved in methylene chloride along with 0.0066 g ($1 \times 10^{-5}$ mols/BPA unit) of cyclohexyltriphenylphosphonium tetraphenyl borate serving as a solid-phase polymerization catalyst, to which was added n-heptane so as to deposit the prepolymer. After concentrated, this was dried in vacuum to obtain a powder of the prepolymer. 20 g of the powder was put into a SUS tube having a diameter of 58 mm and a length of 170 mm, into which was introduced nitrogen gas at a flow rate of 100 ml/min. In that condition, this was heated from room temperature up to 240° C., and polymerized in a solid phase for 4 hours. Thus was obtained a polycarbonate. The viscosity-average molecular weight (Mv), the hydroxyl terminal fraction, the remaining monomer content (phenol content, bisphenol A content, diphenyl carbonate content), the acetone soluble content and the cyclic oligomer content of the polycarbonate were measured, and the data obtained are given in Tables 1 and 2.

(5)

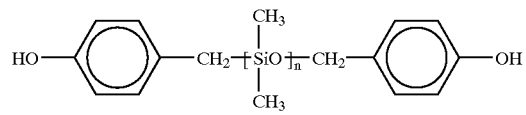

wherein n is 40.8.

Example 2

The same process as in Example 1 was repeated, except that n-heptane gas but not nitrogen gas was introduced into the reactor tube for solid-phase polymerization. The data of the polymer thus produced herein are given in Tables 1 and 2.

Example 3

The same process as in Example 1 was repeated, except that dimethoxydimethylsilane (from Tokyo Chemical, represented by formula (6)) but not polydimethylsiloxane was used as the comonomer. The amount of the comonomer was not 5.1 g (0.063 mols in terms of organosiloxane unit) but 4.8 g (0.04 mols). The data of the polymer thus produced herein are given in Tables 1 and 2.

(6)

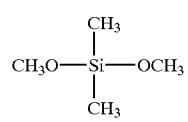

Reference Example 1

This is the same as in Example 1. In this, however, the entire process from preparing the prepolymer to polymerizing it into a polymer having an increased molecular weight was conducted through melt transesterification but not solid-phase polymerization. In the step of oligomer formation in this, tetramethylammonium hydroxide (0.5 mmols) and tetraphenylphosphonium tetraphenyl borate (0.01 mmols) both serving as a catalyst were used, and the polymerization time under the vacuum degree of 0.5 mmHg was 3 hours but not 30 minutes. The data of the polymer thus produced herein are given in Tables 1 and 2.

Example 4

228 g (1.0 mol) of bisphenol A, 3.6 g (0.04 mols) of 1,4-butanediol, 257 g (1.20 mols) of diphenyl carbonate, and 0.5 mmols of tetramethylammonium hydroxide (TMAH) were put into a one-liter nickel autoclave equipped with a stirrer, which was then purged five times with argon gas. Next, the mixture was heated at 190° C., and reacted for 30 minutes in the argon atmosphere. This was gradually heated up to 235° C. and reacted for 60 minutes with being vacuumed up to a vacuum degree of 60 mmHg; then this was further heated gradually up to 270° C. and reacted for 120 minutes with being vacuumed up to a vacuum degree of 10 mmHg; then this was still further reacted at that temperature of 270° C. for 30 minutes with being vacuumed up to a vacuum degree of 1 mmHg; and finally, this was still further reacted at that temperature for 30 minutes with being vacuumed up to a vacuum degree of 0.5 mmHg. After the reaction, the reactor was restored with argon to have an atmospheric pressure, and the prepolymer formed therein was taken out, and ground. The prepolymer had a viscosity-average molecular weight of 5830, and a terminal hydroxyl fraction of 40%.

The prepolymer was dissolved in methylene chloride along with 0.0066 g ($1\times10^{-5}$ mols) of cyclohexyltriphenylphosphonium tetraphenyl borate serving as a solid-phase polymerization catalyst, to which was added n-heptane so as to deposit the prepolymer. After concentrated, this was dried in vacuum to obtain a powder of the prepolymer. 20 g of the powder was put into a SUS tube having a diameter of 58 mm and a length of 170 mm, into which was introduced nitrogen gas at a flow rate of 100 ml/min. In that condition, this was heated from room temperature up to 240° C., and polymerized in a solid phase for 4 hours. Thus was obtained a polycarbonate. The viscosity-average molecular weight (Mv), the hydroxyl terminal fraction, the remaining monomer content (phenol content, bisphenol A content, diphenyl carbonate content), the acetone soluble content and the cyclic oligomer content of the polycarbonate were measured, and the data obtained are given in Tables 1 and 2.

Example 5

The same process as in Example 4 was repeated, except that n-heptane gas but not nitrogen gas was introduced into the reactor tube for solid-phase polymerization. The data of the polymer thus produced herein are given in Tables 1 and 2.

Example 6

The same process as in Example 4 was repeated, except that 1,4-cyclohexanedimethanol but not 1,4-butanediol was used as the comonomer. The data of the polymer thus produced herein are given in Tables 1 and 2.

Example 7

The same process as in Example 4 was repeated, except that 1,4-cyclohexanediol but not 1,4-butanediol was used as the comonomer. The data of the polymer thus produced herein are given in Tables 1 and 2.

Reference Example 2

This is the same as in Example 1. In this, however, the entire process from preparing the prepolymer to polymerizing it into a polymer having an increased molecular weight was conducted through melt transesterification but not solid-phase polymerization. In the step of oligomer formation in this, tetramethylammonium hydroxide (0.5 mmols) and tetraphenylphosphonium tetraphenyl borate (0.01 mmols) both serving as a catalyst were used, and the polymerization time under the vacuum degree of 0.5 mmHg was 3 hours but not 30 minutes. The data of the polymer thus produced herein are given in Tables 1 and 2.

TABLE 1

|  | Viscosity-Average Molecular Weight, Mv | Polymer Structure Ratio of organosiloxane unit/aromatic dihydroxy residue unit (by mol) |
|---|---|---|
| Example 1 | 298000 | 4.0/96.0 |
| Example 2 | 292000 | 4.2/95.8 |
| Example 3 | 315000 | 1.0/99.0 |
| Example 4 | 196000 | 1.1/98.9 |
| Example 5 | 192000 | 1.2/98.8 |
| Example 6 | 189000 | 1.0/99.0 |
| Example 7 | 195000 | 1.1/98.9 |
| Reference Example 1 | 236000 | 5.8/94.2 |
| Reference Example 2 | 186000 | 1.0/99.0 |

TABLE 2

|  | Terminal Hydroxyl Fraction (mol %) | Remaining Monomers (ppm) | | | Acetone Soluble Content (wt. %) | Cyclic Oligomer Content (wt. %) |
|---|---|---|---|---|---|---|
|  |  | phenol | BPA | DPC |  |  |
| Example 1 | 5.0 | 10 | 10 | 10 | 0.9 | 0.10 |
| Example 2 | 5.2 | 10 | 20 | 20 | 1.0 | 0.11 |
| Example 3 | 4.9 | 20 | 10 | 10 | 1.2 | 0.13 |
| Example 4 | 8.4 | 10 | 30 | 10 | 0.4 | 0.09 |
| Example 5 | 9.0 | 10 | 20 | 20 | 1.0 | 0.11 |
| Example 6 | 8.3 | 10 | 20 | 20 | 2.0 | 0.13 |
| Example 7 | 8.6 | 10 | 30 | 10 | 1.5 | 0.12 |
| Ref. Ex. 1 | 16.0 | 20 | 30 | 270 | 3.1 | 0.46 |
| Ref. Ex. 2 | 20.0 | 10 | 30 | 250 | 3.3 | 0.47 |

INDUSTRIAL APPLICABILITY

Of the aromatic polycarbonate copolymer of the invention, the remaining monomer content, the acetone soluble content (that is, the low-molecular-weight substance content), and the cyclic oligomer content are all reduced, and the terminal hydroxyl fraction thereof is also reduced. According to the production method of the invention, obtained are polycarbonates of which the terminal hydroxyl content and also the remaining monomer content, the acetone soluble content and the cyclic oligomer content are all reduced.

What is claimed is:

1. An aromatic polycarbonate copolymer with units of an aromatic dihydroxy compound being copolymerized with at least one member selected from the group consisting of polyorganosiloxanes and aliphatic polyalcohols via a carbonate group therebetween, of which the total of the dihydroxy compound content, the dicarbonate content and the monohydroxy compound content is smaller than 100 ppm.

2. An aromatic polycarbonate copolymer with units of an aromatic dihydroxy compound being copolymerized with at least one member selected from the group consisting of polyorganosiloxanes and aliphatic polyalcohols via a carbonate group therebetween, of which the dihydroxy compound content is smaller than 100 ppm.

3. An aromatic polycarbonate copolymer with units of an aromatic dihydroxy compound being copolymerized with at least one member selected from the group consisting of polyorganosiloxanes and aliphatic polyalcohols via a carbonate group therebetween, of which the acetone soluble content is at most 3.0% by weight.

4. An aromatic polycarbonate copolymer with units of an aromatic dihydroxy compound being copolymerized with at least one member selected from the group consisting of polyorganosiloxanes and aliphatic polyalcohols via a carbonate group therebetween, of which the cyclic oligomer content is at most 0.45% by weight.

5. An aromatic polycarbonate copolymer with units of an aromatic dihydroxy compound being copolymerized with at least one member selected from the group consisting of polyorganosiloxanes and aliphatic polyalcohols via a carbonate group therebetween, of which the terminal hydroxyl fraction is at most 20% by mol.

6. An optical material comprising the polycarbonate a copolymer of claim 1.

7. A method for producing a polycarbonate copolymer through transesterification of (A) an aromatic dihydroxy compound and (B) at least one member selected from the group consisting of polyorganosiloxanes and aliphatic polyalcohols with (C) a dicarbonate, which comprises prepolymerizing the dihydroxy compound, at least one member selected from the group consisting of polyorganosiloxanes and aliphatic polyalcohols, and the dicarbonate under heat to give a polycarbonate prepolymer, followed by polymerizing the prepolymer in a solid or swollen solid phase in the presence of a quaternary phosphonium salt serving as a catalyst.

8. The method for producing a polycarbonate copolymer as claimed in claim 7, wherein a nitrogen-containing, organic basic compound that serves as a catalyst is used in the prepolymerization step to give the polycarbonate prepolymer.

9. The method for producing a polycarbonate copolymer as claimed in claim 7, wherein the polycarbonate prepolymer is polymerized in an atmosphere containing at least one gas selected from the group consisting of bad solvent gases, swelling solvent gases and inert gases, in a solid or swollen solid phase in the presence of a quaternary phosphonium salt serving as a catalyst.

10. An aromatic polycarbonate copolymer with units of an aromatic dihydroxy compound being copolymerized in the solid or swollen solid phase with at least one member selected from the group consisting of polyorganosilxanes and aliphatic polyalcohols via a carbonate group therebetween, of which the total of the dihydroxy compound content, the dicarbonate content and the content of monohydroxy compound resulting from the polycarbonate polymer formation reaction is less than 100 ppm.

* * * * *

UNITED STATES PATENT AND TRADEMARK OFFICE
CERTIFICATE OF CORRECTION

PATENT NO. : 6,476,249 B1
DATED : November 5, 2002
INVENTOR(S) : Ito

It is certified that error appears in the above-identified patent and that said Letters Patent is hereby corrected as shown below:

<u>Title page,</u>
Item [87], should read:

-- [87]  PCT Pub. No.: WO00/18822
PCT Pub. Date: April 6, 2000 --

Signed and Sealed this

Twenty-second Day of April, 2003

JAMES E. ROGAN
*Director of the United States Patent and Trademark Office*